United States Patent

Braun et al.

[11] Patent Number: 5,901,260
[45] Date of Patent: May 4, 1999

[54] OPTICAL INTERFACE DEVICE

[75] Inventors: Steve W. Braun, Leucadia; Henri Hodara, Dana Point, both of Calif.; John J. Soderberg, Acworth; G. Allan Whittaker, Alpharetta, both of Ga.

[73] Assignee: Lockheed Martin Corporation, Bethesda, Md.

[21] Appl. No.: 08/831,375

[22] Filed: Apr. 1, 1997

[51] Int. Cl.⁶ ..................................................... G02B 6/28
[52] U.S. Cl. ................... 385/24; 385/48; 385/31; 359/136
[58] Field of Search .................. 385/24, 44, 30, 385/48, 47, 31, 32, 46; 359/109, 111, 127, 136

[56] References Cited

U.S. PATENT DOCUMENTS 4,810,052  3/1989  Fling ...................................... 385/24 X

*Primary Examiner*—Phan T.H. Palmer
*Attorney, Agent, or Firm*—Eric R. Katz

[57] ABSTRACT

An optical interface device for extracting, inserting and passing light transmitted bi-directionally on one or more fiber optic line, comprises: a first optical coupler for receiving light to be inserted onto or extracted from the fiber optic line; and a fiber optic-line, optical coupler, coupled to the fiber optic line and to the first optical coupler, for passing light on the fiber optic line, for receiving light from the first optical coupler to be inserted onto the fiber optic line and transmitting said received light in opposite directions on the fiber optic line, and for extracting light from opposite directions on the fiber optic line and transmitting said extracted light to the first optical coupler.

6 Claims, 4 Drawing Sheets

OPTICAL INTERFACE DEVICE

BACKGROUND OF THE INVENTION

1. Field of the Invention

The present invention generally relates to an optical interface device for extracting, inserting and passing light transmitted bi-directionally on a fiber optic line, and more particularly to such an optical interface device for use as a fundamental element of a non-blocking, bidirectional, multi-channel, protocol independent transmission medium for the simultaneous transfer of digital, analog, and discrete data.

2. Background Discussion

A variety of different topologies are employed to manage the transmission of data over a network. Known network topologies include: 1) broadcast, such as utilized on a data bus; 2) point-to-point repeater link, such as seen with the ring configuration; 3) and logical star, where all data is transmitted to a central location for retransmission to an intended recipient.

One particular problem with these known network topologies is that they cannot be easily integrated with one another. In essence, once a particular topology is chosen for managing the transmission and receipt of data on a given network, that topology must always be used by the network. This lack of adaptability is a particular detrimental problem when new or more useful topologies are developed but cannot be applied to existing data transmission networks which are locked into archaic, less efficient topologies.

Recent advances in data transmission technology have been directed to increasing the bandwidth or data capacity of the network, i.e., increasing the amount of data that can be transmitted by the network.

Physics imposes data rates limits on standard optical networks which encode data in pulses of laser light and dispatch them through wires made of glass. Very fast data rates require very short pulses, which tend to smear into one another as they travel through kilometers of fiber. Electronic devices staggered along the path can clean up the signal, but they are expensive and can work on at most 50 billion bits per second.

To go faster, researchers have transmitted many signals simultaneously over a single fiber by encoding them in different wavelengths or channels. Devices that use this technique, known as wavelength division multiplexing (WDM) have boosted the capacity of existing fiber twenty fold.

SUMMARY OF THE INVENTION

Accordingly, it is an object of the present invention to provide an optical interface device for extracting, inserting and passing light transmitted bi-directionally on a fiber optic line.

It is a further object of the present invention is to provide such an optical interface device for use as a fundamental element of a non-blocking, bidirectional, multi-channel, protocol independent transmission medium for the simultaneous transfer of digital, analog, and discrete data.

These and other objects, advantages and features of the present invention are achieved, according to one embodiment of the present invention by an optical interface device for extracting, inserting and passing light transmitted bi-directionally on a fiber optic line, comprising: a first optical coupler for receiving light to be inserted onto or extracted from the fiber optic line; and a fiber optic-line, optical coupler, coupled to the fiber optic line and to the first optical coupler, for passing light on the fiber optic line, for receiving light from the first optical coupler to be inserted onto the fiber optic line and transmitting said received light in opposite directions on the fiber optic line, and for extracting light from opposite directions on the fiber optic line and transmitting said extracted light to the first optical coupler.

According to a further embodiment of the present invention, the optical interface device is capable of extracting, inserting and passing light transmitted bi-directionally on first and second fiber optic lines, wherein the device comprises: a first optical coupler for receiving light to be inserted onto or extracted from the first fiber optic line; a pair of first fiber optic-line, optical couplers, each coupled to the first fiber optic line and to the first optical coupler, for passing light on the first fiber optic line, for receiving light from the first optical coupler to be inserted onto the first fiber optic line and transmitting said received light in opposite directions on the first fiber optic line, and for extracting light from opposite directions on the first fiber optic line and transmitting said extracted light to the first optical coupler; a second optical coupler for receiving light to be inserted onto or extracted from the second fiber optic line; and a pair of second fiber optic-line, optical couplers, each coupled to the second fiber optic line and to the second optical coupler, for passing light on the second fiber optic line, for receiving light from the second optical coupler to be inserted onto the second fiber optic line and transmitting said received light in opposite directions on the second fiber optic line, and for extracting light from opposite directions on the second fiber optic line and transmitting said extracted light to the second optical coupler.

The present invention is a unique and unobvious arrangement of passive fiber optic couplers, which when combined with wavelength division multiplexing, selectively route the optical signals in and out of a network at each junction point or node on the network. This arrangement of couplers constitutes a totally optical interface to the network and is referred to herein as the optical bus interface module (OBIM). The optical signals that are fed in or out of the network are then processed within the node through the use of an electro-optical interface card (EOIC) which includes wavelength selective filters, photoreceivers and a laser transmitter. The input and the output of the EOIC are connected to a translation logic card (TLC) which performs the required protocol translation.

DETAILED DESCRIPTION OF THE PREFERRED EMBODIMENT(S)

Figure 1:
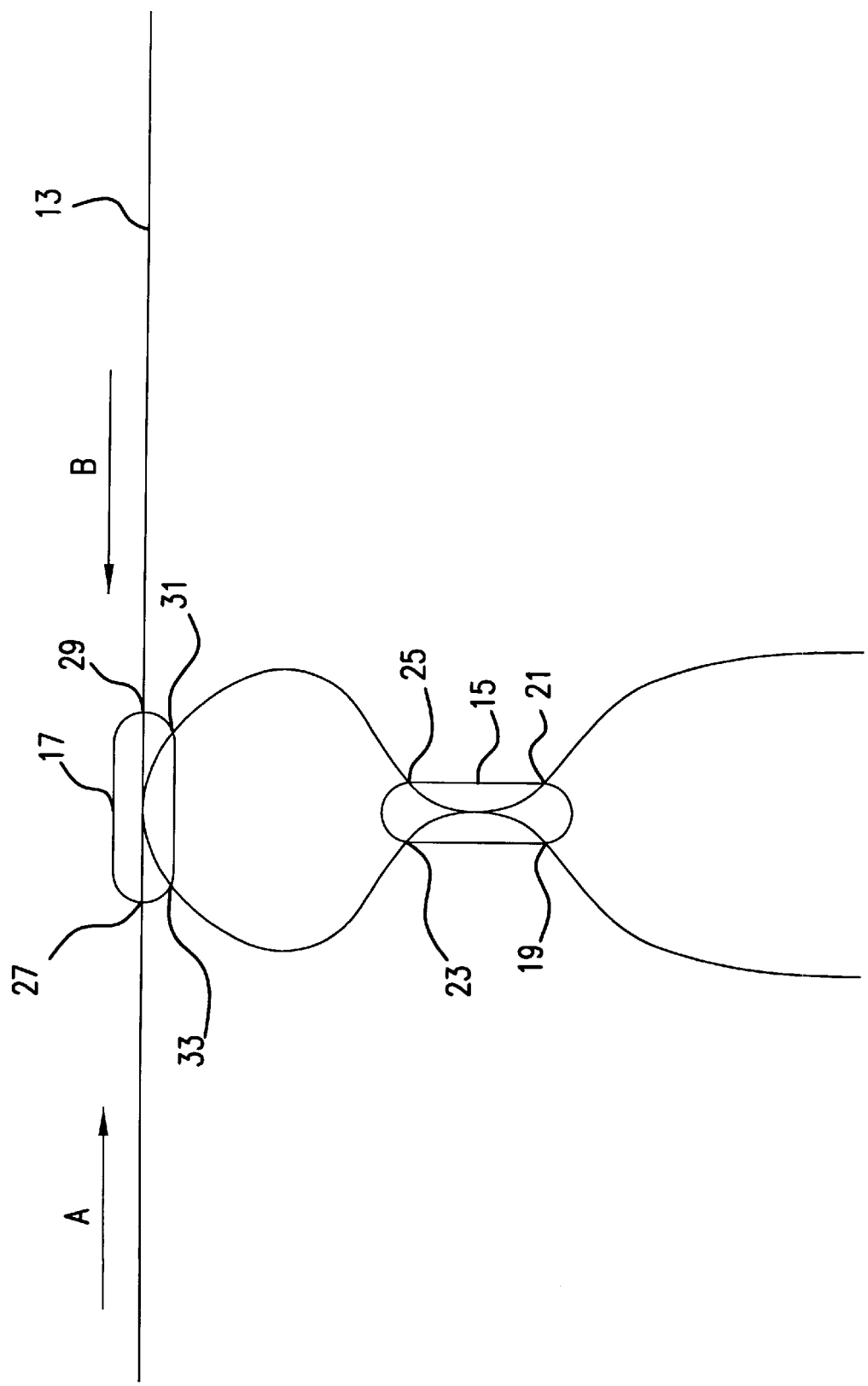
FIG. 1 schematically illustrates a first embodiment of the optical interface device of the present invention for use with a single fiber optic line.

Referring to FIG. 1, a first embodiment of an optical interface device, generally indicated at 11, is illustrated for extracting, inserting and passing light transmitted bi-directionally on a single fiber optic line 13. The device 11 comprises a first optical coupler 15 for receiving light to be inserted onto or which has been extracted from the fiber optic line 13 and a fiber optic-line, optical coupler 17, coupled to the fiber optic line 13 and to the first optical coupler 15, for extracting, inserting and passing light transmitted bi-directionally on the single fiber optic line 13. The fiber optic line-optical, coupler 17 is adapted to: 1) pass light coming from either direction (A or B) along the fiber optic line 13, 2) receive light from the first optical coupler 15 to be inserted, simultaneously and bi-directionally onto the fiber optic line 13 and 3) extract light coming from either direction (A or B) on the fiber optic line 13 and transmit said extracted light to the first optical coupler 15.

The first optical coupler 15, shown in the embodiment of FIG. 1 is, for example, a four port, bi-directional optical coupler having, for example, a 50/50 coupling ratio, although other split ratios are envisioned for use by the present invention, for example, in the range of about 99/1 to 1/99. The first optical coupler 15 is provided as the interface to and from a device which is adapted to transmit light to the fiber optic line 13 and/or receive light from the fiber optic line 13. Light inputed to the first optical coupler 15 is split thereby and provided at both output ports thereto.

The first optical coupler 15 has first and second ports, 19, 21, for receiving light to be inserted onto the fiber optic line 13 or for transmitting light extracted from the fiber optic line 13 by the fiber optic-line, optical coupler 17. Also included are third and fourth ports, 23, 25, each respectively connected to one port of the fiber optic-line, optical coupler 17 such that light received by at least one of the first and second ports 19, 21, is split by the first optical coupler 15 and transmitted, for example, in equal amounts, by both the third and fourth ports 23, 25 to the fiber optic line 13 in opposite directions by the fiber optic-line, optical coupler 17 as will be more fully discussed below.

Light extracted from the fiber optic line 13 by the fiber optic-line, optical coupler 17 and received by either of the third and fourth ports 23, 25 is split, for example, equally by the first optical coupler 15 and transmitted by the both the first and second ports 19, 21, one of which will function as an input port and the other of which will function as an output port.

According to the embodiment of FIG. 1, the fiber optic-line, optical coupler 17 comprises a four port, bidirectional optical coupler, such as, for example, a wave division multiplexing broadband coupler (880 nm/1550 nm) having, for example, an 80/20 coupling ratio as will be more fully describe hereinbelow, although other split ratios are envisioned for use by the present invention, for example, in the range of about 99/1 to 1/99. A first port 27 of the coupler 17 is provided for receiving light transmitted in a first direction A on the fiber optic line 13 and for transmitting light: 1) received from the fiber optic line 13 in a second direction B, opposite to the first direction (pass through) or 2) inserted onto the fiber optic line 13 from port 25 of the first optical coupler 15 in the second direction B.

The fiber optic-line, coupler 17 also includes a second port 29 for transmitting light: 1) received from the fiber optic line 13 in said first direction A by the first port 27 or 2) inserted onto the fiber optic line 13 from port 23 of the first optical coupler 15 in the first direction A and for receiving light from fiber optic line 13 in the second direction B.

A third port 31 is provided for transmitting light received from the fiber optic line 13 by the first port 27 in the first direction A to port 25 of the first optical coupler 15 and for receiving light from port 25 of the first optical coupler 15 for insertion onto the fiber optic line 13 in the second direction B. A fourth port 33 transmits light received from the fiber optic line 13 in the second direction B to port 23 of the first optical coupler 15 and receives light from port 23 of the first optical coupler 15 for insertion onto the fiber optic line 13 in the first direction A.

Thus, light received by the first port 27 of the fiber optic-line, optical coupler 17 is split thereby and transmitted by both the second and third ports, 29 and 31 respectively. Light received by the second port 29 is split by the fiber optic-line, optical coupler 17 and transmitted by both the first and fourth ports, 27 and 33, respectively. In order to maintain signal strength on the fiber optic line 13, the fiber optic-line, optical coupler 17 has, for example, an 80/20 coupling ratio, as noted above, such that 80% of the light is passed by the coupler 17 along the line 13 and 20% of the light is split off or extracted from the fiber optic line 13 and coupled to the first optical coupler 15.

In operation, light to be inserted bi-directionally onto the fiber optic line 13 is inputed to either of the first and second ports 19, 21 of first optical coupler 15 of the interface device 11. Coupler 15 splits the inputted light, for example, equally which is then transmitted equally by both the third and fourth ports 23, 25 of the first optical coupler 15 respectively to the third and fourth ports 31, 33 of the fiber-optic, line optical coupler 17. Light received by third port 31 is inserted onto the fiber optic line 13 in direction B and light received by fourth port 33 is inserted onto the fiber optic line 13 in direction A. Therefore, light inputed to one of the first and second ports of first optical coupler 15 is inserted bi-directionally onto the fiber optic line 13.

The device 11 is also capable of extracting light coming from either direction A or B along the fiber optic line 13 as well as passing such light further along on the fiber optic line 13. For example, light coming from direction B on the fiber optic line 13 is received by second port 29 of the fiber optic-line, optical coupler 17 and split thereby such that, for example, 80% of the light is transmitted by first port 27 of the fiber optic-line, optical coupler 29 further along on the fiber optic line 13 in direction B and 20% of the light, for example, is transmitted to port 23 of the first optical coupler 15. Optical coupler 15 then splits the light received at port 23 and transmits said light via ports 19 and 21.

Figure 2:
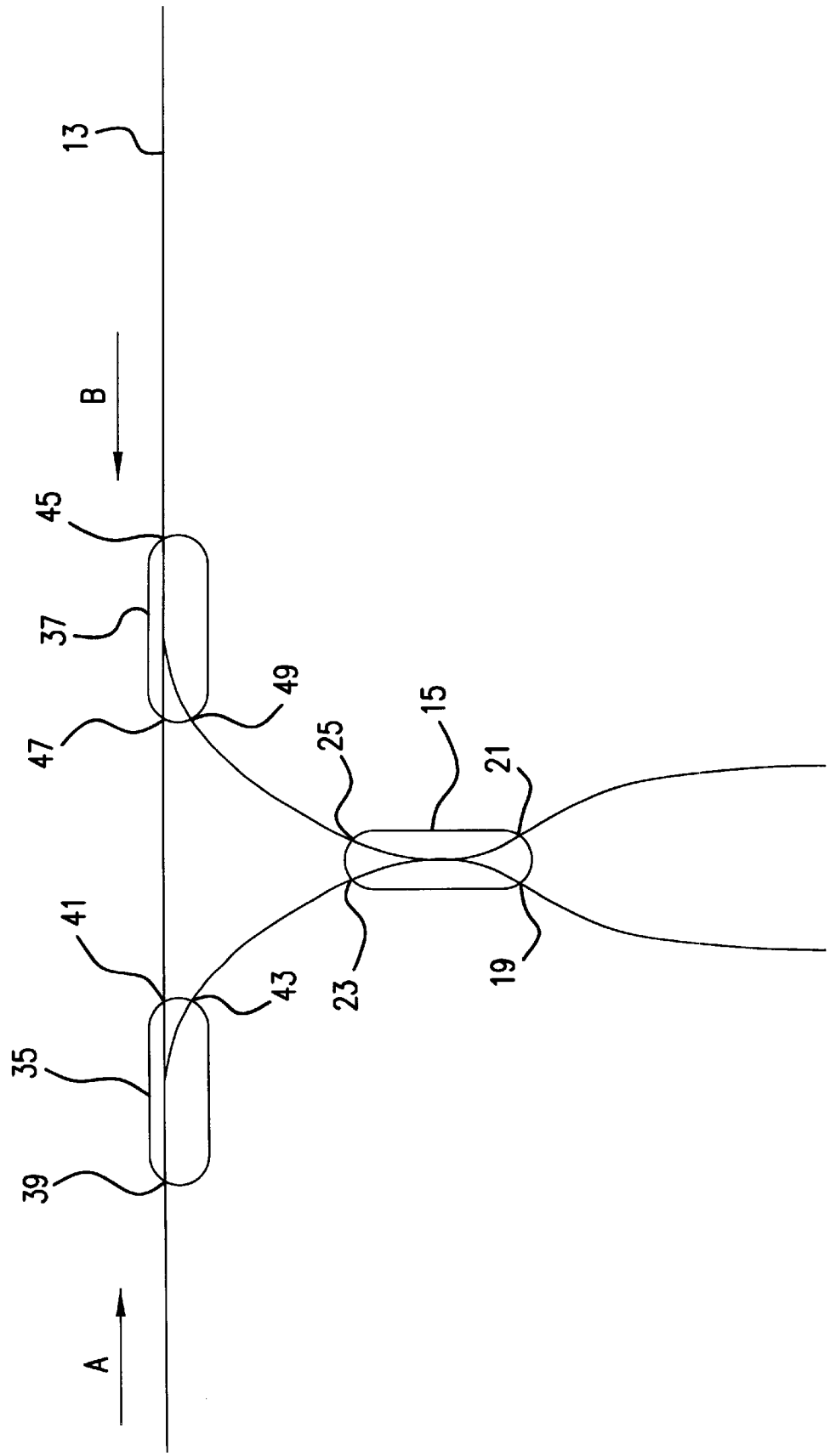
FIG. 2 illustrates a further embodiment of the optical interface device of FIG. 1 wherein a pair of fiber optic-line, optical couplers are employed

Referring to FIG. 2, an alternative embodiment of optical coupler of FIG. 1 is illustrated wherein the fiber optic-line, optical coupler 17 comprises first and second fiber optic-line, optical couplers 35, 37. The first fiber optic-line, optical coupler 35 has a first port 39 for receiving light transmitted in direction A on the fiber optic line 13 and for transmitting light received from the second fiber optic-line, optical coupler 37 in the second direction B or the first optical coupler 15 to the fiber optic line 13 for insertion onto the fiber optic line 13 in the second direction B. A second port 41 is provided for passing light, received by the first port 39 to the second fiber optic-line, optical coupler 37, along the fiber optic line 13 in direction A, and for receiving light coming from direction B via the second fiber optic-line, optical coupler 37. Also provided is a third port 43 for extracting light received from the fiber optic line 13 by the first port 39 in direction A to the first optical coupler 15. As a result of the configuration of the first fiber optic-line, optical coupler 37, light received by the first port 39 of the first fiber optic-line, optical coupler 37 is split by the first fiber optic-line, optical coupler 37 and transmitted by both the second 41 and third ports 43.

The second fiber optic-line, optical coupler 37 comprises a fourth port 45 for receiving light coming from direction B on the fiber optic line 13 and for passing light received from first optic line optical coupler 35 or inserting light from the first optical coupler 15 onto the fiber optic line 13 in direction A. Also included is a fifth port 47 for passing light, received by the fourth port 45 from the fiber optic line 13 in direction B, to the first fiber optic-line, optical coupler 35 and for receiving light in direction A from the first fiber optic-line, optical coupler 35. A sixth port 49 is provided for extracting light received from the fiber optic line 13 in the direction B by the fourth port 45 to the first optical coupler 15 such that light received by the fourth port 45 of the second fiber optic-line, optical coupler 37 is split by the second fiber optic-line, optical coupler 37 and transmitted by both the fifth 47 and sixth ports 49.

Figure 3:
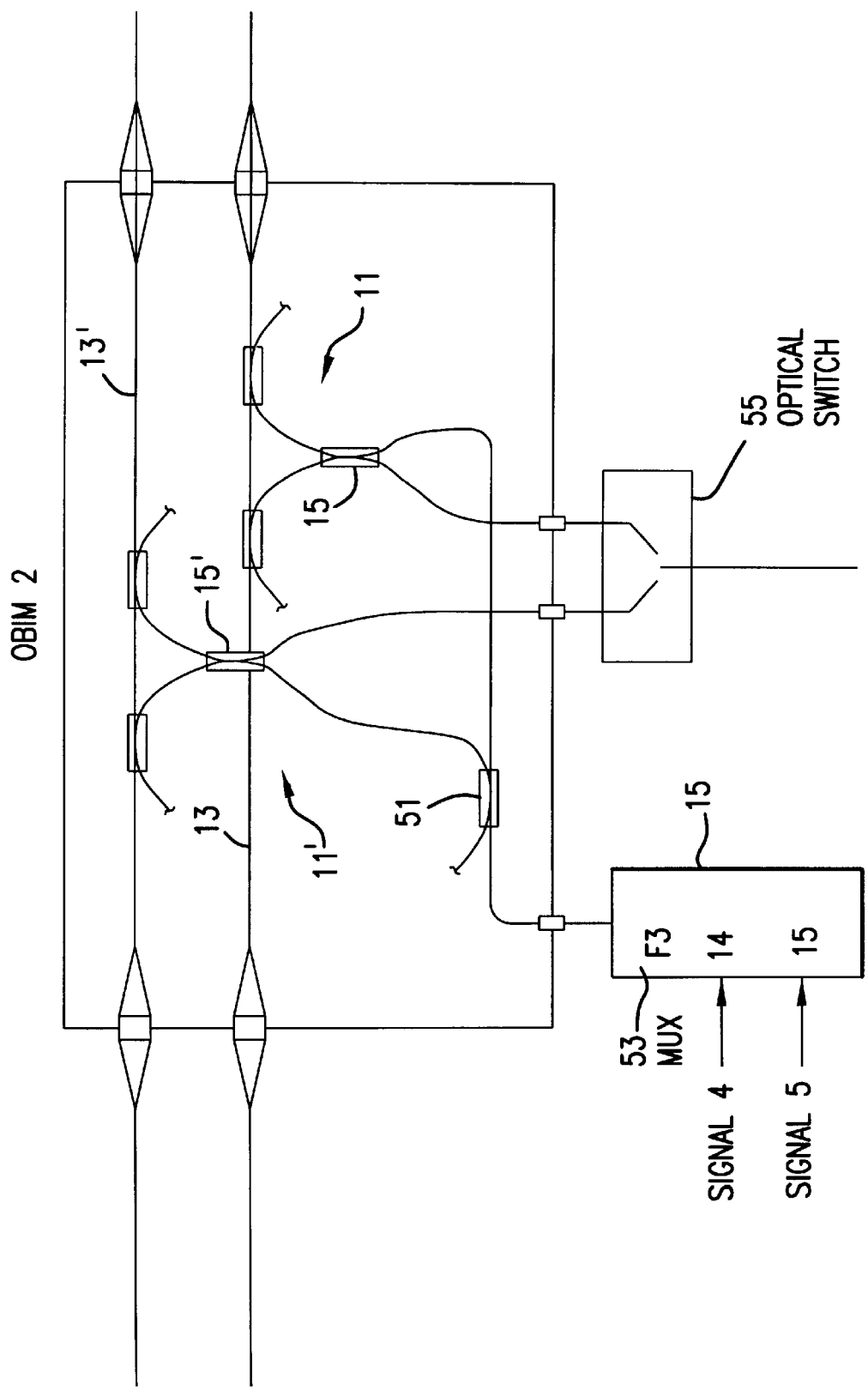
FIG. 3 illustrates yet another embodiment of the optical interface device of the present invention wherein the optical signal is inserted, extracted and passed on two separated but redundant fiber optic lines.

Referring to FIG. 3, a further embodiment of the present invention is illustrated wherein light is simultaneously inserted, extracted and passed bi-directionally on a pair of first and second fiber optic lines 13 and 13'. In the embodiment illustrated by FIG. 3 a pair of first and second optical interface devices 11 and 11', such as disclosed by FIG. 2, are each respectively connected to one of the pair of first and second fiber optic lines 13 and 13'.

An input optical coupler 51 having, for example, a coupling ratio of 50/50, is provided to -receive an optical input signal from, for example, multiplexer 53. This input signal is equally split by the input optical coupler 51, provided to both of the optical interface devices 11 and 11' and inserted, bi-directionally onto each of the first and second fiber optic lines 13, 13' as previously discussed above.

In the embodiment of FIG. 3, one of the first or second ports of each of the first optical couplers 15, 15' is connected to an output optical switch 55. Signals extracted by the optical interface devices 11, 11' are provided to the optical switch 55 which is employed to select one of the extracted signals for further process if required.

In lieu of the optical interface device of FIG. 2, it is understood that optical interface devices such as illustrated by FIG. 1 can be employed by embodiment illustrated by FIG. 3. In addition, it is understood that according to the teaching of the present invention, light can be simultaneously inserted, extracted and passed bi-directionally on a plurality of fiber optic lines using the optical interface device of the present invention as best seen, for example, in FIG. 4.

Figure 4:
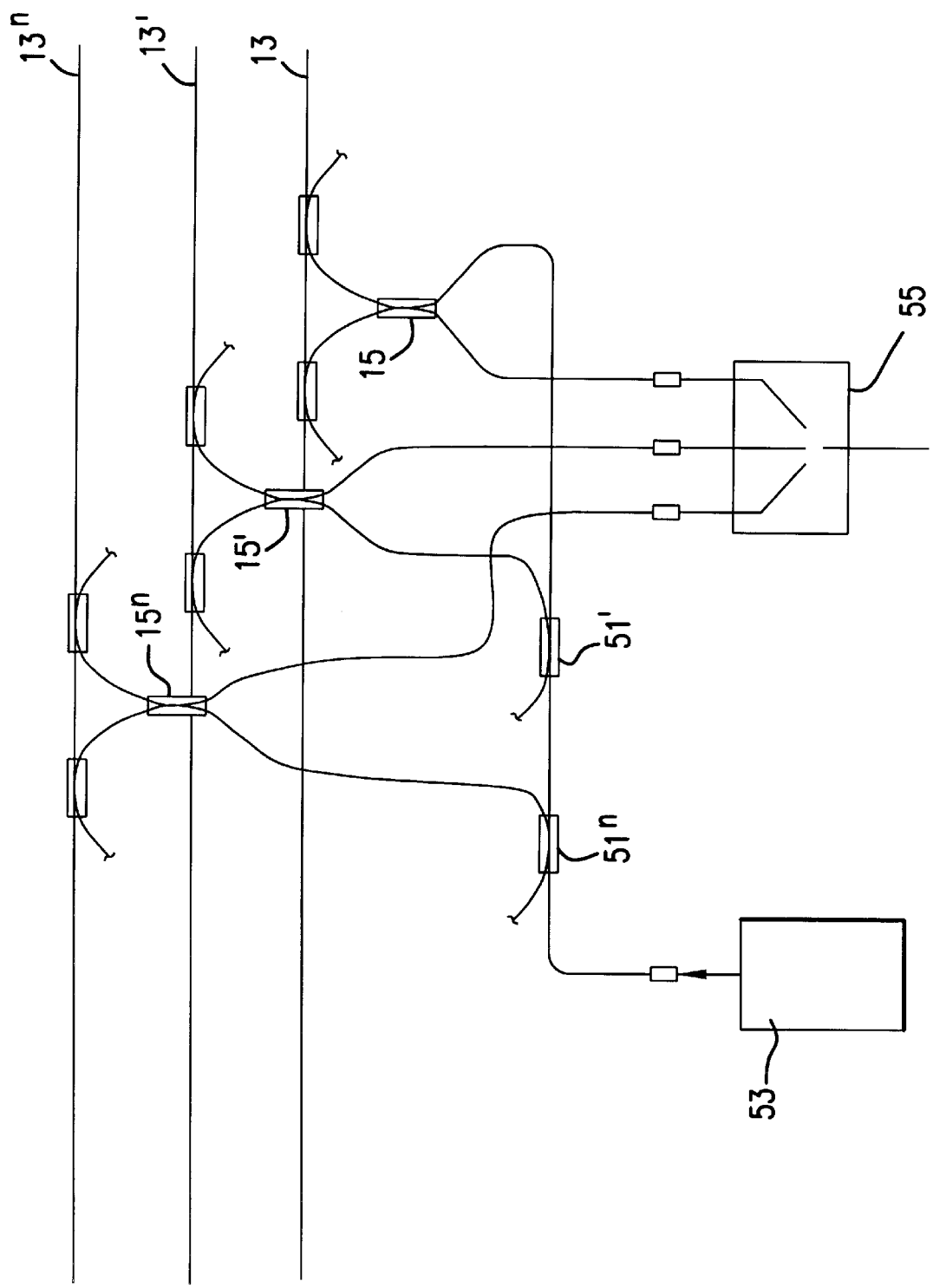
FIG. 4 illustrates another embodiment of the optical interface device of the present invention wherein the optical signal is inserted, extracted and passed on a plurality of separate but redundant fiber optic lines.

Referring to FIG. 4, an embodiment of the present invention is illustrated wherein light is simultaneously inserted, extracted and passed bi-directionally on a plurality of fiber optic lines 13, 13' . . . 13$^n$, where n is any number greater than 3. In the embodiment illustrated by FIG. 4, n optical interface devices 11, 11' . . . 11$^n$, such as disclosed by FIG. 2, are each respectively connected to one of fiber optic lines 13, 13' . . . 13$^n$.

Input optical couplers 51' . . . 51$^n$, each associated with a pair of the fiber optic lines 13, 13' . . . 13$^n$ and having, for example, a coupling ratio of 50/50, are provided to receive an optical input signal from, for example, multiplexer 53. This input signal is equally split by each of the input optical couplers 51' . . . 51$^n$, provided to each of the plurality of optical interface devices 11, 11' . . . 11$^n$, and inserted, bi-directionally onto each of the plurality of n fiber optic lines 13, 13' . . . 13$^n$ as previously discussed above.

In the embodiment of FIG. 4, one of the first or second ports of each of a plurality of first optical couplers 15, 15' . . . 15$^n$, associated with one of the fiber optic lines 13, 13' . . . 13$^n$, is connected to an output optical switch 55. Signals extracted by the optical interface devices 11, 11' . . . 11$^n$ are provided to the optical switch 55 which is employed to select one of the extracted signals for further process if required.

In lieu of the optical interface device of FIG. 2, it is understood that optical interface devices such as illustrated by FIG. 1 can be employed by embodiment illustrated by FIG. 4.

Although the present invention has been described with particular reference to its preferred embodiments, it should be understood that many variations and modifications will now be obvious to those skilled in that art, and it is preferred, therefore, that the scope of the invention be limited, not by the specific disclosure herein, but only by the appended claims.

What is claimed is:

1. An optical interface device for extracting, inserting and passing light transmitted bi-directionally on a fiber optic line, the device comprising:

a first optical coupler for receiving input light signals for insertion onto the fiber optic line and for transmitting output light signals extracted from the fiber optic line; and a second optical coupler, coupled to the fiber optic line and to the first optical coupler, for passing light signals bi-directionally on the fiber optic line, for inserting input light signals received from the first optical coupler bi-directionally on the fiber optic line, and for extracting output light signals from opposite directions on the fiber optic line and transmitting the output light signals to the first optical coupler;

wherein the first optical coupler is a four port, bi-directional optical coupler having first and second ports for both receiving input light signals and for transmitting output light signals, and third and fourth ports connected to the second optical coupler;

wherein input light signals received by at least one of the first and second ports is split by the first optical coupler and transmitted to both the third and fourth ports; and wherein output light signals received from the second optical coupler by at least one of the third and fourth ports is split by the first optical coupler and transmitted by the both the first and second ports; and wherein the second optical coupler comprises a pair of optical couplers each having:

a first port connected to the fiber optic line;

a second port, connecting the pair of optical couplers to one another; and a third port connected to one of the third and fourth ports of the first optical coupler;

wherein light signals received by the first port of one of the pair of optical couplers is split and transmitted to the first port and third ports of the of other of the pair of optical couplers; and wherein input light signals from the first optical coupler are received by the third port of each of the pair of optical couplers and inserted bi-directionally onto the fiber optic line by the respective first ports of the pair of optical couplers.

2. An optical interface device for extracting, inserting and passing light transmitted bi-directionally on first and second fiber optic lines, the device comprising:

a first optical coupler for receiving input light signals for insertion bi-directionally onto the first fiber optic line and for transmitting output light signals extracted from the first fiber optic line; and a first pair of optical couplers coupled to the first fiber optic line and to the first optical coupler, for passing light signals on the first fiber optic line, for receiving input light signals from the first optical coupler and transmitting the input light signals bi-directionally on the first fiber optic line, and for extracting output light signals from opposite directions on the first fiber optic line and transmitting the output light signals to the first optical coupler;

a second optical coupler for receiving input light signals for insertion bi-directionally onto the second fiber optic line and for transmitting output light signals extracted from the second fiber optic line; and;

a second pair of optical couplers coupled to the second fiber optic line and to the second optical coupler, for passing light signals on the second fiber optic line, for receiving input light signals from the second optical coupler and transmitting the input light signals bi-directionally on the second fiber optic line, and for extracting output light signals from opposite directions on the second fiber optic line and transmitting the output signals to the second optical coupler.

3. An optical interface device according to claim 2, wherein the first and second optical couplers are each a four port, bidirectional optical coupler.

4. An optical interface device according to claim 3, wherein the first optical coupler has:

first and second ports for both receiving input light signals to be inserted bi-directionally onto the first fiber optic line and for transmitting output light signals extracted from the first fiber optic line, and third and fourth ports connected to the first pair of optical couplers;

wherein input light signals received by at least one of the first and second ports is split by the first optical coupler and transmitted to both the third and fourth ports; and wherein output light signals received from the first pair of optical coupler by at least one of the third and fourth ports is split by the first optical coupler and transmitted by the both the first and second ports; and wherein the second optical coupler has:

first and second ports for receiving input light signals to be inserted bi-directionally onto the second fiber optic line and for transmitting output light signals extracted from the second fiber optic line, and third and fourth ports connected to the second pair of optical couplers;

wherein input light signals received by at least one of the first and second ports is split by the second optical coupler and transmitted to both the third and fourth ports; and wherein output light signals received from the second pair of optical coupler by at least one of the third and fourth ports is split by the second optical coupler and transmitted by the both the first and second ports.

5. An optical interface device according to claim 4, wherein the first pair optical couplers each have:

a first port connected to the first fiber optic line;

a second port, connecting the first pair of optical couplers to one another; and a third port connected to one of the third and fourth ports of the first optical coupler;

wherein light signals received by the first port of one of the first pair of optical couplers is split and transmitted to the first port and third ports of the of other of the first pair of optical couplers; and wherein input light signals from the first optical coupler are received by the third port of each of the first pair of optical couplers and inserted bi-directionally onto the first fiber optic line by the respective first ports of the first pair of optical couplers; and wherein the second pair of optical couples each have:

a first port connected to the second fiber optic line;

a second port, connecting the second pair of optical couplers to one another; and a third port connected to one of the third and fourth ports of the second optical coupler;

wherein light signals received by the first port of one of the second pair of optical couplers is split and transmitted to the first port and third ports of the of other of the second pair of optical couplers; and wherein input light signals from the second optical coupler are received by the third port of each of the second pair of optical couplers and inserted bi-directionally onto the second fiber optic line by the respective first ports of the second pair of optical couplers.

6. An optical interface device for extracting, inserting and passing light transmitted bi-directionally on each of a plurality of fiber optic lines, each of the plurality of fiber optic lines having associated therewith:

a first optical coupler for receiving input light signals for insertion bi-directionally onto the associated fiber optic line and for transmitting output light signals extracted from the associated fiber optic line;

a pair optical couplers coupled to the associated fiber optic line and to the first optical coupler, for passing light signals on the associated fiber optic line, for receiving input light signals from the first optical coupler and transmitting the input light signals bi-directionally on the associated fiber optic line, and for extracting output light signals from opposite directions on the associated fiber optic line and transmitting the output light signals to the first optical coupler;

wherein the first optical coupler is a four port, bi-directional optical coupler having first and second ports for both receiving input light signals and for transmitting output light signals, and third and fourth ports connected to the pair of optical couplers;

wherein input light signals received by at least one of the first and second ports is split by the first optical coupler and transmitted to both the third and fourth ports; and wherein output light signals received from the pair of optical couplers by at least one of the third and fourth ports is split by the first optical coupler and transmitted by the both the first and second ports; and wherein the pair of optical couplers each have:

a first port connected to the associated fiber optic line;

a second port, connecting the pair of optical couplers to one another; and a third port connected to one of the third and fourth ports of the first optical coupler;

wherein light signals received by the first port of one of the pair of optical couplers is split and transmitted to the first port and third ports of the of other of the pair of optical couplers; and wherein input light signals from the first optical coupler are received by the third port of each of the pair of optical couplers and inserted bi-directionally onto the associated fiber optic line by the respective first ports of the pair of optical couplers.

* * * * *